United States Patent
Kikuchi et al.

(10) Patent No.: US 8,029,882 B2
(45) Date of Patent: Oct. 4, 2011

(54) POROUS SILICON CARBIDE AND PROCESS FOR PRODUCING THE SAME

(75) Inventors: Yoshio Kikuchi, Nagoya (JP); Shinji Kawasaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/206,600

(22) Filed: Sep. 8, 2008

(65) Prior Publication Data

US 2009/0011179 A1    Jan. 8, 2009

Related U.S. Application Data

(63) Continuation of application No. PCT/JP2007/052789, filed on Feb. 15, 2007.

(30) Foreign Application Priority Data

Mar. 20, 2006   (JP) .................................. 2006-076000

(51) Int. Cl.
  *B32B 3/12* (2006.01)
  *B22F 3/11* (2006.01)
  *B01J 27/224* (2006.01)
  *B01J 21/00* (2006.01)

(52) U.S. Cl. ............ 428/116; 419/2; 502/178; 502/232; 502/237

(58) Field of Classification Search ...... 419/2; 502/178, 502/232, 237, 527.24; 428/116, 304.4, 317.9
See application file for complete search history.

(56) References Cited

U.S. PATENT DOCUMENTS

| | | | |
|---|---|---|---|
| 2003/0021949 A1 | 1/2003 | Tomita et al. | |
| 2003/0134084 A1* | 7/2003 | Ichikawa et al. | 428/116 |
| 2004/0033893 A1 | 2/2004 | Tomita et al. | |
| 2005/0161849 A1* | 7/2005 | Ohno et al. | 264/43 |
| 2006/0068159 A1* | 3/2006 | Komori et al. | 428/116 |
| 2006/0154021 A1* | 7/2006 | Ohno et al. | 428/116 |

FOREIGN PATENT DOCUMENTS

| | | |
|---|---|---|
| JP | A 2002-154882 | 5/2002 |
| JP | A 2002-201082 | 7/2002 |
| JP | A 2002-356383 | 12/2002 |

* cited by examiner

*Primary Examiner* — Gordon R Baldwin
(74) *Attorney, Agent, or Firm* — Oliff & Berridge, PLC

(57) ABSTRACT

A silicon carbide porous object includes silicon carbide as an aggregate and metal silicon as a binder, the particles of silicon carbide being bonded to one another so as to have pores thereamong. A method for producing a silicon carbide porous object includes: firing raw materials formed by mixing silicon carbide and metal silicon with metal aluminum or an alloy including metal silicon and metal aluminum in an inert gas atmosphere or a reduced-pressure atmosphere to produce a metal aluminum-metal silicon-silicon carbide porous object; and oxidizing and firing the metal aluminum-metal silicon-silicon carbide porous object in an oxygen atmosphere.

11 Claims, No Drawings

US 8,029,882 B2

POROUS SILICON CARBIDE AND PROCESS FOR PRODUCING THE SAME

TECHNICAL FIELD

The present invention relates to a silicon carbide porous object used in a filter for purifying vehicle exhaust gas or a catalyst carrier, and a method for producing the same.

BACKGROUND ART

A porous honeycomb structure has been widely used as a filter for trapping and removing particulate matter included in dust containing fluid such as diesel engine exhaust gas, or a catalyst carrier for carrying a catalyst component purifying harmful substances in exhaust gas. As a constituent material of such a honeycomb structure, fire-resistant particles such as silicon carbide (SiC) particles have been used.

The present inventors proposed a porous honeycomb structure (Si-bonded SiC porous object) including fire-resistant particles (silicon carbide particles) as an aggregate and metal silicon as a binder bonding the fire-resistant particles to one another, and a method for producing the same (See Patent Document 1). The honeycomb structure disclosed in Patent Document 1 can be produced at a relatively low firing temperature with high yield, has a high thermal conductivity, a sufficient porosity, and a high-specific surface area, and can be appropriately used as a filter or a catalyst carrier.

In the silicon carbide porous object, there are problems to be solved according to a special environment or a process method.

For example, when metal silicon is heated in a low-oxygen atmosphere or a reduction atmosphere, Si is volatilized or SiO is volatilized as shown in the following formula (1). When Si or SiO in the gas state causes oxidation reaction, violent heat-generation is accompanied with the reaction.

$$Si + 1/2 O_2 \rightarrow SiO\uparrow \qquad (1)$$

The generated SiO gas is combined with oxygen in an atmosphere to generate $Si_2$ fiber, which precipitates on the surface. For this reason, a color in the part where such the oxidation reaction has occurred changes to white by the generation of $SiO_2$ fiber.

To solve the aforementioned problem, for example, there has been proposed a silicon carbide porous object in which a phase including oxygen is formed on the surface or in the vicinity of silicon carbide particles and/or metal silicon (see Patent Document 2). In the silicon carbide porous object described in Patent Document 2, a melting point of the phase including oxygen on the surface or in the vicinity of silicon carbide and/or metal silicon is at most 1700° C. When the other metal is mixed therein, the melting point decreases and oxidation resistance deteriorates.

To solve the aforementioned problems, it has been examined that silicon carbide and/or metal silicon, particularly, metal silicon is coated with a compound (e.g., corundum) including alumina having a melting point higher than that of the phase including oxygen on the surface or in the vicinity of vicinity of silicon carbide and/or metal silicon.

Patent Document 1: JP-A 2002-201082
Patent Document 2: JP-A 2002-154882

DISCLOSURE OF THE INVENTION

The present invention has been made to solve the aforementioned problems, and an object of the present invention is to provide a silicon carbide porous object and a method for producing the same, in which only the surface of metal silicon is selectively coated with a compound having a high melting point, thereby decreasing the possibility of oxidation reaction of metal silicon to occur, improving oxidation resistance, and minimizing decrease in porosity.

To achieve the aforementioned object, according to the present invention, there are provided a silicon carbide porous object and a method for producing the same as follows.

[1] A silicon carbide porous object including silicon carbide as an aggregate and metal silicon as a binder, the particles of silicon carbide being bonded to one another with the binder so as to have pores thereamong, in which the surface of the metal silicon is selectively coated with more of a phase including alumina than the silicon carbide.

[2] The silicon carbide porous object according to the above [1], wherein the phase including alumina contains at least one compound selected from the group consisting of alkali earth metal, rare-earth metal, silicon (Si), titanium (Ti), cobalt (Co), and nickel (Ni).

[3] The silicon carbide porous object according to the above [1] or [2], wherein an open porosity of the pores is in the range of 30 to 75%.

[4] The silicon carbide porous object according to any one of the above [1] to [3], wherein an average diameter of the pores is in the range of 5 to 50 μm.

[5] The silicon carbide porous object according to any one of the above [1] to [4], wherein a volume-specific heat capacity is 2.1 $Jcm^{-3}K^{-1}$ or more.

[6] A honeycomb structure formed by using the silicon carbide porous object according to any one of the above [1] to [5].

[7] A method for producing a silicon carbide porous object including silicon carbide as an aggregate and metal silicon as a binder, the particles of silicon carbide being bonded to one another with the binder so as to have pores thereamong, the method including:

firing raw materials formed by mixing silicon carbide and metal silicon with metal aluminum or an alloy including metal silicon and metal aluminum in an inert gas atmosphere or a reduced-pressure atmosphere to produce a metal aluminum-metal silicon-silicon carbide porous object; and oxidizing and firing the metal aluminum-metal silicon-silicon carbide porous object in an oxygen atmosphere.

[8] The method for producing a silicon carbide porous object according to the above [7], wherein a mixing ratio of the metal aluminum to the metal silicon is in the range of 0.05 to 1.5 in terms of molar ratio (Al/Si).

[9] The method for producing a silicon carbide porous object according to the above [7] or [8], wherein the raw materials are fired at 600 to 1500° C. in an inert gas atmosphere or a reduced-pressure atmosphere in which an oxygen partial pressure is $10^{-4}$ atm or less.

[10] The method for producing a silicon carbide porous object according to any one of the above [7] to [9], wherein the metal aluminum-metal silicon-silicon carbide porous object is oxidized and fired at 700 to 1500° C. in an oxygen atmosphere.

[11] The method for producing a silicon carbide porous object according to the above [7], wherein after producing the metal aluminum-metal silicon-silicon carbide porous object, the atmosphere is converted into an oxygen atmosphere at 700° C. or above without decreasing to a room temperature and the metal aluminum-metal silicon-silicon carbide porous object is oxidized and fired at 700 to 1500° C. in the oxygen atmosphere.

[12] The method for producing a silicon carbide porous object according to any one of the above [7] to [11], wherein a water vapor partial pressure of the oxygen atmosphere is $10^{-5}$ atm or less.

[13] The method for producing a silicon carbide porous object according to any one of the above [7] to [12], wherein an oxygen partial pressure of the oxygen atmosphere is 0.05 atm or more.

As described above, according to the silicon carbide porous object and the method for producing the same, only the surface of metal silicon is selectively coated with the compound having a high melting point, thereby decreasing the possibility of oxidation reaction of metal silicon to occur, improving oxidation resistance, and minimizing decrease in porosity.

BEST MODE FOR CARRYING OUT THE INVENTION

Hereinafter, a silicon carbide porous object and a method for producing the same of the present invention will be described in detail with reference to specific embodiments. However, the present invention is not limited thereto, and may be variously changed, modified, and improved by knowledge of a person ordinary skill in the art without departing from the scope of the present invention.

A silicon carbide porous object according to the present invention includes silicon carbide as an aggregate and metal silicon as a binder, the particles of silicon carbide being bonded one another with the binder so as to have pores thereamong, in which the surface of the metal silicon is selectively coated with more of a phase including alumina than the silicon carbide.

The phase including alumina used in the present invention preferably includes at least one compound selected from the group consisting of alkali earth metal, rare-earth metal, silicon (Si), titanium (Ti), cobalt (Co), and nickel (Ni). Since the phase includes the compound, it is possible to make the phase (compound having a high melting point) including alumina thick.

In the silicon carbide porous object of the present invention, an open porosity of pores is preferably in the range of 30 to 75% (more preferably in the range of 50 to 60%). When the open porosity is smaller than 30%, pressure loss increases. When the open porosity is larger than 75%, strength decreases.

In the silicon carbide porous object of the present invention, an average diameter of the pores is preferably in the range of 5 to 50 μm (more preferably in the range of 10 to 30 μm). When the average diameter of the pores is smaller than 5 μm, pressure loss increases. When the average diameter of the pores is larger than 50 μm, particulate matters leak out.

The silicon carbide porous object of the present invention is appropriately usable as a constituent member (e.g., honeycomb segment) of a honeycomb structure used in a filter for purifying vehicle exhaust gas or a catalyst carrier.

As described above, according to the silicon carbide porous object of the present invention, only the surface of metal silicon is selectively coated with the phase (compound having a high melting point) including alumina, thereby reducing the possibility of oxidation reaction of metal silicon to occur, improving oxidation resistance, and minimizing decrease in porosity.

Next, the method for producing the silicon carbide porous object will be described.

According to the present invention, there is provided a method for producing a silicon carbide porous object including silicon carbide as an aggregate and metal silicon as a binder, the particles of silicon carbide being bonded to one another with the binder so as to have pores thereamong, the method including: firing raw materials formed by mixing silicon carbide and metal silicon with metal aluminum or an alloy including metal silicon and metal aluminum in an inert gas atmosphere or a reduced-pressure atmosphere to produce a metal aluminum-metal silicon-silicon carbide porous object; and oxidizing and firing the metal aluminum-metal silicon-silicon carbide porous object in an oxygen atmosphere.

A main characteristic of the method for producing the silicon carbide porous object of the present invention is in that metal aluminum or an alloy including metal silicon and metal aluminum is added to silicon carbide and metal silicon as raw materials. Accordingly, the method for producing the silicon carbide porous object of the present invention may have the following advantages [A] to [E]

[A] Only the surface of metal silicon can be selectively coated with a phase (compound having a high melting point) including alumina. Accordingly, it is possible to decrease occurrence of oxidation reaction of metal silicon in the silicon carbide porous object in the low oxygen atmosphere as shown in the formula (1) by the phase (compound having a high melting point) including alumina. Accordingly, it is possible to improve oxidation resistance of the silicon carbide porous object and it is possible to minimize the coating of silicon carbide with the phase (compound having a high melting point) including alumina. Accordingly, it is possible to minimize decrease in porosity of the silicon carbide porous object.

[B] It is possible to improve wettability of metal silicon to silicon carbide by removing silicon oxide on the surfaces of silicon carbide and metal silicon according to the following formula (2).

$$3SiO_2 + 4Al \rightarrow 3Si + 2Al_2O_3 \qquad (2)$$

[C] A melting point of a bonded part is decreased by adding metal aluminum or an alloy including metal silicon and metal aluminum to silicon carbide and metal silicon as raw materials. Accordingly, it is possible to lower a firing temperature of the metal aluminum-metal silicon-silicon carbide porous object (silicon carbide porous object before oxidation), which is economical.

[D] It is possible to reduce a firing contraction ratio (size before firing/size after firing) of the metal aluminum-metal silicon-silicon carbide porous object (silicon carbide porous object before oxidation) by adding metal aluminum or an alloy including metal silicon and metal aluminum to silicon carbide and metal silicon as raw materials.

[E] The surface of metal silicon having a low volume-specific heat capacity can be coated with the phase including alumina that is a compound having a high volume-specific heat capacity. Accordingly, it is possible to prevent increase in temperature of metal silicon in the silicon carbide porous object exposed to high-temperature gas. Accordingly, it is possible to prevent increase in temperature of the silicon carbide porous object.

In the method for producing the silicon carbide porous object of the present invention, a mixing ratio of metal aluminum to metal silicon is preferably in the range of 0.05 to 1.5 (more preferably in the range of 0.2 to 0.7 in terms of molar ratio (Al/Si). When the molar ratio is lower than 0.05, it is difficult to coat the whole surface of metal silicon. When the molar ratio is higher than 1.5, a bonding ratio of silicon carbide to metal silicon is lowered and characteristics such as thermal conductivity deteriorate.

In the method for producing the silicon carbide porous object of the present invention, the raw materials of the metal aluminum-metal silicon-silicon carbide are fired preferably at 600 to 1500° C. (more preferably at a primary crystallization temperature with respect to the molar ratio (Al/Si)) in an inert gas atmosphere or a reduced-pressure atmosphere in which an oxygen partial pressure is $10^{-4}$ atm or less.

In the method for producing the silicon carbide porous object of the present invention, the metal aluminum-metal silicon-silicon carbide porous object obtained after the firing is oxidized and fired preferably at 700 to 1500° C. (more preferably 1200 to 1400° C.) in an oxygen atmosphere. Accordingly, in the obtained silicon carbide porous object, silicon carbide is bonded to metal silicon and it is possible to keep a coating state of metal silicon coated with the phase (compound having a high melting point) including alumina satisfactorily. Therefore, it is possible to improve oxidation resistance.

A water vapor partial pressure in the oxygen atmosphere is preferably $10^{-5}$ atm or less, and an oxygen partial pressure in the oxygen atmosphere is preferably 0.05 atm or more.

In the method for producing the silicon carbide porous object of the present invention, after producing the metal aluminum-metal silicon-silicon carbide porous object, the atmosphere is converted into an oxygen atmosphere preferably at 700° C. or above (more preferably at a primary crystallization temperature with respect to the molar ratio (Al/Si)) without decreasing to a room temperature and the metal aluminum-metal silicon-silicon carbide porous object is oxidized and fired at 700 to 1500° C. (more preferably at 1200 to 1400° C.) in the oxygen atmosphere. The condition of the oxygen atmosphere is the same as described above.

EXAMPLES

Hereinafter, the present invention will be described in more detail with reference to Examples. However, the present invention is not limited to the following Examples at all.

Examples 1 to 10 and Comparative Examples 1 to 9

Raw materials obtained by adding metal aluminum (molar ratio of metal aluminum to metal silicon (Al/Si)) and the other additive shown in Table 1 or Table 2 to silicon carbide of 80 mass % and metal silicon of 20 mass % were fired in atmospheres shown in Table 1 or Table 2 under conditions shown in Table 1 or Table 2, thereby producing metal aluminum-metal silicon-silicon carbide porous objects. The obtained metal aluminum-metal silicon-silicon carbide porous objects were oxidized and fired in atmospheres shown in Table 1 or Table 2. Al contents of the surfaces of metal silicon and silicon carbide, and coating states of metal silicon coated with a phase (compound having a high melting point) including alumina in the obtained silicon carbide porous objects were measured and assessed by means of a scanning electron microscope and an energy dispersion type X-ray analyzer, and identification of main Al-containing crystal phases of phases including alumina was carried out by an X-ray diffraction method. Porosities, average diameters, and oxidation resistances of the obtained silicon carbide porous objects were assessed. The results are shown in Table 1 and Table 2. The average diameters of the pores of the silicon carbide porous objects were measured by a mercury penetration method, and porosities thereof were measured by an Archimedes' method. Oxidation resistances were assessed in the following manner.

(Assessment of Oxidation Resistance)

"Oxidation resistance" was assessed by an oxidation test under a low-oxygen partial pressure. That is, the silicon carbide porous objects were kept in an electric furnace in an Ar gas atmosphere of an oxygen partial pressure of 0.01 atm at a test temperature for 10 minutes, and then change in appearance thereof was examined. When the SiO gas generated in the manner of the formula (1) was combined with oxygen in the atmosphere to form $SiO_2$, the porous object was changed to white in appearance. Test temperatures of the change in appearance are shown in Table 1 and Table 2.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| added amount of metal aluminum (molar raito(Al/Si)) | | 0.7 | 0.2 | 0.4 | 0.7 | 0.05 | 1.5 | 0.7 | 0.7 | 0.7 | 0.7 |
| other additive | | none | $SrCO_3$ | none | none | $SrCO_3$ | none | none | none | none | none |
| firing condition | temperature (° C.) | 1200 | 1450 | 1450 | 1200 | 1450 | 750 | 1200 | 1200 | 1200 | 1200 |
| | oxygen partial pressure(atm) | $<10^{-5}$ | $<10^{-5}$ | $<10^{-5}$ | $<10^{-5}$ | $<10^{-5}$ | $<10^{-5}$ | $<10^{-5}$ | $<10^{-5}$ | $<10^{-5}$ | $<10^{-5}$ |
| | gas type, pressure | Ar, atm. | Ar, atm. | Ar, reduced | Ar, atm. | Ar, atm. | Ar, atm. | Ar, atm. | Ar, atm. | Ar, atm. | Ar, atm. |
| oxidation condition | temperature (° C.) | 1350 | — | 1200 | 1350 | — | 900 | 1200 | 1350 | 1350 | 1350 |
| | water vapor partial pressure(atm) | $<10^{-5}$ | — | $<10^{-5}$ | $<10^{-5}$ | — | $<10^{-5}$ | $<10^{-5}$ | — | 0.1 | $<10^{-5}$ |
| | oxygen partial pressure(atm) | 1 | — | 1 | 1 | — | 1 | 1 | 0.2 | 0.05 | 0.01 |
| | swiching temperature (° C.) | room temp. | — | room temp. | Room temp. | — | room temp. | 1000 | room temp. | room temp. | room temp. |
| Al content of metal silicon surface | | large | large | large | large | large | large | large | large | large | large |
| Al content of silicon carbide surface | | small | small | small | small | small | small | small | small | small | small |
| coating state of silicon metal in phase including alumina | | ◎ | ◎ | ◎ | ◎ | ◎ | ◎ | ◎ | ○ | Δ | ○ |
| main Al containing crystal phase | | $Al_2O_3$ | $SrAl_2O_4$ | $Al_2O_3$ | $Al_2O_3$ | $SrAl_2O_4$ | $Al_2O_3$ | $Al_2O_3$ | $Al_2O_3$ | $Al_2O_3$ | $Al_2O_3$ |
| porosity (%) | | 51 | — | 36 | 67 | — | — | — | — | — | — |

TABLE 1-continued

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| average diameter of pores (μm) | 23 | — | 10 | 34 | — | — | — | — | — | — |
| oxidation resistance whitening temperature (° C.)) | 1400 | 1400 | 1400 | 1400 | 1400 | 1400 | 1400 | 1350 | 1350 | 1350 |
| firing contraction | 1.016 | 1.015 | — | — | — | — | — | — | — | — |
| volume-specific heat capacity(Jcm$^{-3}$K$^{-1}$) | 2.6 | 2.3 | — | — | 2.1 | 3.3 | — | — | — | — |

TABLE 2

|  |  | Comp. 1 | Comp. 2 | Comp. 3 | Comp. 4 | Comp. 5 | Comp. 6 | Comp. 7 | Comp. 8 | Comp. 9 |
|---|---|---|---|---|---|---|---|---|---|---|
| added amount of metal aluminum (molar raito(Al/Si)) | | 0 | 0 | 0 | 0 | 1.5 | 1.5 | 0.7 | 0.01 | 4 |
| other additive | | none | none | Al$_2$O$_3$ | Al$_2$O$_3$ sol coat to Comp. 1 | none | none | none | SrCO$_3$ | none |
| firing condition | temperature (° C.) | 1450 | 1450 | 1450 | 1450 | 1450 | 500 | 1200 | 1450 | 1000 |
|  | oxygen partial pressure(atm) | <10$^{-5}$ | <10$^{-5}$ | <10$^{-5}$ | <10$^{-5}$ | 0.2 | <10$^{-5}$ | <10$^{-5}$ | <10$^{-5}$ | <10$^{-5}$ |
|  | gas type, pressure | Ar, atm. | Ar, atm. | Ar, atm. | Ar, atm. | Air, atm. | Ar, atm. | Ar, atm. | Ar, atm. | Ar, atm. |
| oxidation condition | temperature (° C.) | — | 1200 | 1400 | 1400 | — | — | 600 | — | 1200 |
|  | water vapor partial pressure(atm) | — | 0.1 | — | — | — | — | — | — | <10$^{-5}$ |
|  | oxygen partial pressure(atm) | — | 0.05 | 0.2 | 0.2 | — | — | 0.2 | — | 1 |
|  | swiching termperature (° C.) | — | room temp. | room temp. | room temp. | — | — | room temp. | — | room temp. |
| Al content of metal silicon surface | | none | none | containing | containing | silicon carbide is not bonded with metal silicon | silicon carbide is not bonded with metal silicon | metal aluminum is not oxidized | small | silicon carbide is not bonded with metal silicon |
| Al content of silicon carbide surface | | none | none | containing | containing |  |  |  | none |  |
| coating state of metal silicon in phase including alumina | | none | none | x | ⊚ |  |  |  | x |  |
| main Al containing crystal phase | | — | — | Al$_6$Si$_2$O$_{13}$ | Al$_6$Si$_2$O$_{13}$ |  |  |  | SrAl$_2$O$_4$ |  |
| porosity (%) | | 53 | 52 | 53 | 45 | — | — | — | — | — |
| average diameter of pores (μm) | | 22 | 22 | 23 | 15 | — | — | — | — | — |
| oxidation resistance (whitening temperature (° C.)) | | 1000 | 1300 | 1300 | 1400 | — | — | 1000 | 1000 | — |
| firing contraction | | — | 1.035 | — | — | — | — | — | — | — |
| volume-specific heat capacity(Jcm$^{-3}$K$^{-1}$) | | 1.9 | 2.0 | — | — | — | — | — | — | — |

(Discussion: Examples 1 to 10 and Comparative Examples 1 to 9 )

As can be seen from Table 1 and Table 2, in Examples 1 to 10, the surface of metal silicon was coated with more of a phase including alumina than the silicon carbide. Accordingly, it was possible to improve oxidation resistance of the silicon carbide porous object, and it was possible to minimize the coating of silicon carbide with the phase (compound having a high melting point) including alumina. Therefore, it was possible to minimize decrease in porosity of the silicon carbide porous object.

In Comparative Examples 1 to 3 and Comparative Example 8, the surface of metal silicon was not coated with the phase including alumina, or the coated surface area thereof was small. Accordingly, oxidation resistance of the silicon carbide porous object was insufficient.

In Comparative Example 4, the surface of metal silicon was not selectively coated with the phase including alumina. Accordingly, silicon carbide was also coated as well as metal silicon. Therefore, porosity of the obtained silicon carbide porous object was decreased.

In Comparative Examples 5, 6, and 9, silicon carbide was not bonded to metal silicon. Accordingly, the silicon carbide porous object was not formed.

In Comparative Example 7, metal aluminum was not oxidized. Accordingly, oxidation resistance of the obtained silicon carbide porous object was insufficient.

INDUSTRIAL APPLICABILITY

The silicon carbide porous object of the present invention is appropriately applicable for producing a trap filter for exhaust gas, particularly, a diesel particulate filter (DPF) for trapping particulate matters (particulates) in exhaust gas of diesel engines, and the like.

The invention claimed is:

1. A silicon carbide porous object comprising:
   silicon carbide as an aggregate;
   metal silicon as a binder, particles of silicon carbide being bonded to one another with the binder so as to have pores thereamong;
   a mixture formed with the silicon carbide, the metal silicon, and metal aluminum or an alloy including metal silicon and metal aluminum, the mixture being raw materials;
   a metal aluminum-metal silicon-silicon carbide porous object formed from the firing of the raw materials; and
   a mixing ratio of the metal aluminum to the metal silicon is in the range of 0.05 to 1.5 in terms of molar ratio (Al/Si), wherein
   the surface of the metal silicon is selectively coated with a phase including alumina such that the surface of the metal silicon includes more of the phase including alumina than the surface of the silicon carbide, and
   the raw materials are fired at 600 to 1500° C. in an inert gas atmosphere or a reduced-pressure atmosphere in which an oxygen partial pressure is $10^{-4}$ atm or less.

2. The silicon carbide porous object according to claim 1, wherein the phase including alumina contains at least one compound selected from the group consisting of alkali earth metal, rare-earth metal, silicon (Si), titanium (Ti), cobalt (Co), and nickel (Ni).

3. The silicon carbide porous object according to claim 1, wherein an open porosity of the pores is in the range of 30 to 75%.

4. The silicon carbide porous object according to claim 1, wherein an average diameter of the pores is in the range of 5 to 50 μm.

5. The silicon carbide porous object according to claim 1, wherein a volume-specific heat capacity is 2.1 $Jcm^{-3}K^{-1}$ or more.

6. A honeycomb structure formed by using the silicon carbide porous object according to claim 1.

7. A method for producing a silicon carbide porous object including silicon carbide as an aggregate and metal silicon as a binder, particles of silicon carbide being bonded to one another with the binder so as to have pores thereamong, the method comprising:
   firing raw materials formed by mixing silicon carbide and metal silicon with metal aluminum or an alloy including metal silicon and metal aluminum at 600 to 1500° C. in an inert gas atmosphere or a reduced-pressure atmosphere, in which an oxygen partial pressure is $10^{-4}$ atm or less, to produce a metal aluminum-metal silicon-silicon carbide porous object, a mixing ratio of the metal aluminum to the metal silicon is in the range of 0.05 to 1.5 in terms of molar ratio (Al/Si), wherein the surface of the metal silicon is selectively coated with a phase including alumina such that the surface of the metal silicon includes more of the phase including alumina than the surface of the silicon carbide; and
   oxidizing and firing the metal aluminum-metal silicon-silicon carbide porous object in an oxygen atmosphere.

8. The method for producing a silicon carbide porous object according to claim 7, wherein the metal aluminum-metal silicon-silicon carbide porous object is oxidized and fired at 700 to 1500° C. in an oxygen atmosphere.

9. The method for producing a silicon carbide porous object according to claim 7, wherein after producing the metal aluminum-metal silicon-silicon carbide porous object, the atmosphere is converted into an oxygen atmosphere at 700° C. or above without decreasing to a room temperature and the metal aluminum-metal silicon-silicon carbide porous object is oxidized and fired at 700 to 1500° C. in the oxygen atmosphere.

10. The method for producing a silicon carbide porous object according to claim 7, wherein a water vapor partial pressure of the oxygen atmosphere is $10^{-5}$ atm or less.

11. The method for producing a silicon carbide porous object according to claim 7, wherein an oxygen partial pressure of the oxygen atmosphere is 0.05atm or more.

* * * * *